United States Patent [19]

Sano et al.

[11] Patent Number: 5,073,835

[45] Date of Patent: Dec. 17, 1991

[54] HEAD TRACKING SYSTEM WITH MEMORY FOR STORING CORRECT TRACKING POSITIONS

[75] Inventors: Kohichi Sano; Toshitada Hayashi, both of Tokyo, Japan

[73] Assignee: Sony Corporation, Tokyo, Japan

[21] Appl. No.: 622,220

[22] Filed: Dec. 3, 1990

Related U.S. Application Data

[63] Continuation of Ser. No. 433,434, Nov. 8, 1989, abandoned, which is a continuation of Ser. No. 108,016, Oct. 14, 1987, abandoned.

[30] Foreign Application Priority Data

Oct. 17, 1986 [JP] Japan .................................. 61-246946

[51] Int. Cl.⁵ ............................................... G11B 5/596
[52] U.S. Cl. .................... 360/77.04; 360/78.13
[58] Field of Search ........................................ 360/78.13

[56] References Cited

U.S. PATENT DOCUMENTS

| | | | |
|---|---|---|---|
| 3,959,820 | 5/1976 | Braun | 360/77 |
| 4,157,577 | 6/1979 | Porter, Jr. et al. | 360/77 |
| 4,485,418 | 11/1984 | Bremmer | 360/77.04 |
| 4,499,510 | 2/1985 | Harding et al. | 360/77.02 |
| 4,608,613 | 8/1986 | Miyake | 360/78 |
| 4,630,190 | 12/1986 | Alaimo et al. | 364/167 |
| 4,689,700 | 8/1987 | Miyake et al. | 360/77.06 |
| 4,731,680 | 3/1988 | Moriyama et al. | 318/634 |
| 4,734,799 | 3/1988 | Miyake | 360/77.04 |

FOREIGN PATENT DOCUMENTS

| | | |
|---|---|---|
| 0174095 | 3/1986 | European Pat. Off. . |
| 2408899 | 6/1979 | France . |
| 59-71102 | 4/1984 | Japan ................................. 360/77.06 |

OTHER PUBLICATIONS

IBM Technical Disclosure Bulletin, vol. 23, No. 2, Jul. 1980, pp. 738-742.
Patent Abstracts of Japan, vol. 6, No. 171 (p. 140) [1049], Sep. 4, 1982, relating to JP-A-57-88, 576.

*Primary Examiner*—Aristotelis Psitos
*Assistant Examiner*—David L. Robertson
*Attorney, Agent, or Firm*—Lewis H. Eslinger; Jay H. Maioli

[57] ABSTRACT

When a disk on which signals are recorded in a number of separate tracks is inserted into reproducing apparatus, reproduction signals from a head are first obtained and tracking is performed for each track to determine the position of the head that gives the strongest reproduced signal from each such track. The tracking positions that respectively give the strongest signals from the several tracks are stored in a memory. When it is later desired to reproduce signals from a particular track, the head is positioned on the basis of the content of the memory.

3 Claims, 7 Drawing Sheets

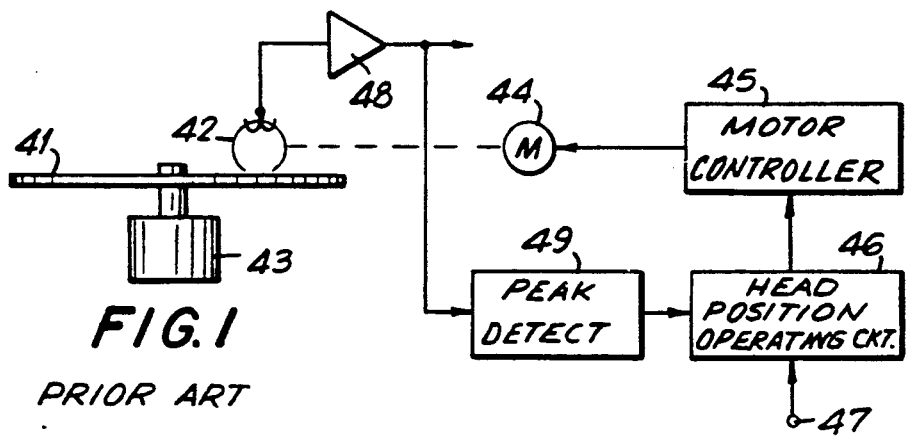
FIG.1
PRIOR ART
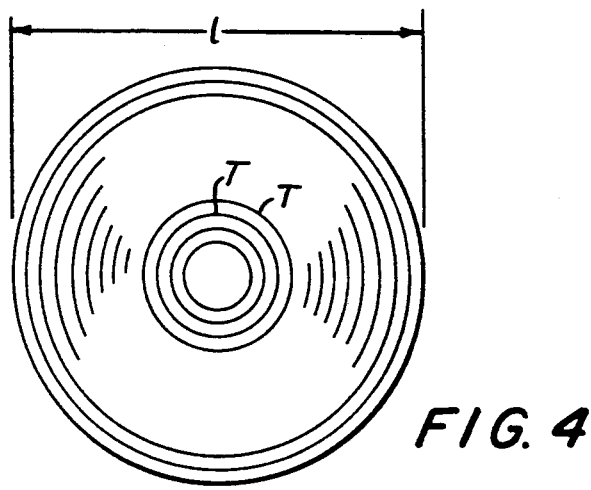
FIG.4
FIG.2
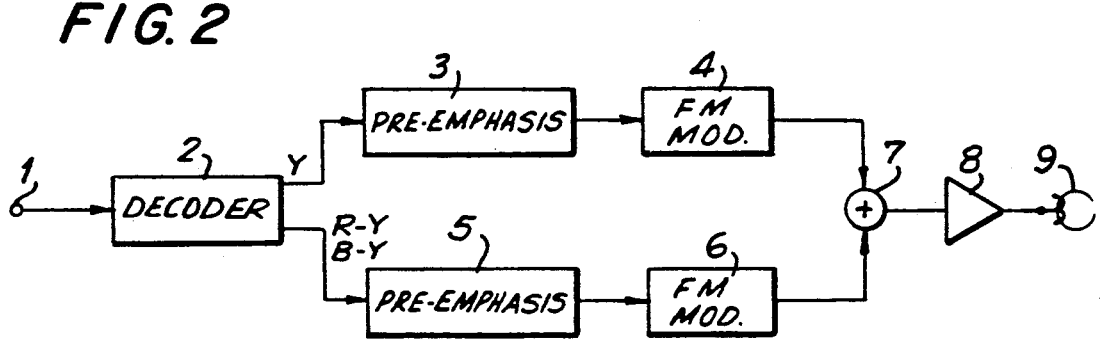

HEAD TRACKING SYSTEM WITH MEMORY FOR STORING CORRECT TRACKING POSITIONS

This is a continuation of application Ser. No. 07/433,434, filed 11-8-89 now abandoned. which is a continuation of application Ser. No. 07/108,016, filed Oct. 14, 1987, now abandoned.

BACKGROUND OF THE INVENTION

1. Field of the Invention

This invention relates to a head tracking system and, more particularly, to novel and highly-effective head moving apparatus that is suitable for use in electronic still video reproducing apparatus wherein video signals of a still image are recorded on a magnetic disk.

2. Description of the Prior Art

There is already known an electronic still camera in which an image of an object to be photographed is picked up by a solid state image pickup device such as a CCD and video signals representing the still image of this object are recorded on a magnetic disk. In such an electronic still camera, when the shutter button is pressed, the video signals of one field or one frame are read out of the solid state image pickup device. The luminance signal Y in the video signals is frequency modulated. The color difference signals (R-Y) and (B-Y) are line sequenced and frequency modulated. The video signals of one field are recorded on a single circular track.

In reproducing a still image, a particular recording track containing the video signals representing a desired still image is selected or designated from a plurality of circular recording tracks formed on the magnetic disk. When the track is thus selected or designated, the head is moved to the selected or designated track. Since the video signals of one field are recorded on one track, a desired still image is reproduced by continuously reproducing the video signals on the designated track in the case of the field recording mode. On the other hand, in the case of the frame recording mode, a desired still image is reproduced by alternately continuously reproducing the video signals on the designated track and the video signals on the subsequent track.

In a conventional electronic still video reproducing apparatus, when a desired still image is reproduced in this manner, a tracking control is performed so that the head can trace the center of a desired track. Such a tracking control has been disclosed in, e.g., U.S. Pat. No. 4,630,144. FIG. 1 appended hereto shows a tracking circuit in a conventional electronic still video reproducing apparatus. In FIG. 1, reference numeral 41 denotes a magnetic disk on which video signals of one field are recorded on each of the circular tracks and 42 indicates a head for reproducing the signals recorded on the magnetic disk 41. The magnetic disk 41 is rotated by a spindle motor 43. The head 42 is moved by a drive motor 44. A stepping motor is used as the drive motor 44.

The drive motor 44 is rotated on the basis of the number of pulses which are generated by a motor controller 45. A signal representing a designated moving amount which is derived by a head position operating circuit 46 is supplied to the motor controller 45. The motor controller 45 generates a number of pulses corresponding to this designated moving amount. These pulses are supplied to the drive motor 44.

When a track designation signal is supplied from a terminal 47 to the head position operating circuit 46, the amplitude of the head movement or head moving amount required for the head to reach the central position of a selected or designated track (hereinafter, this position is referred to as a mechanical center), which is determined in accordance with a predetermined format, is derived by the head position operating circuit 46. The head moving amount thus derived is supplied from the circuit 46 to the motor controller 45. Pulses of a number corresponding to the designated moving amount are generated by the motor controller 45 and supplied to the drive motor 44. Thus, the head 42 is moved to the mechanical center of the designated track.

After the head 42 is moved to the mechanical center of the designated track, the video signals on this track are reproduced by the head 42. The reproduced RF signal is supplied through a reproducing amplifier 48 to a signal processor (not shown) to reproduce the video signals and is also supplied to a peak level detector 49. The head 42 is moved radially inwardly or outwardly with respect to the disk one step at a time. One step corresponds to, e.g., 10 $\mu$m. As the head 42 moves, the RF signal level changes. The position at which the maximum RF signal level is detected is the position at which the tracking is correctly performed. It is determined by the peak level detector 49 whether or not the RF signal level has reached the maximum level.

The level or strength of the reproduced RF signal before the head moves by one step is stored in the peak level detector 49. The reproduced RF signal level before the head is moved and the RF signal level after the head is moved by one step are compared by the peak level detector 49. A comparison output is supplied to the head position operating circuit 46. The head 42 is moved in accordance with the comparison output.

When the reproduced RF signal level after the head moves by one step is greater than the reproduced RF signal level before the head moves, this means that the head has moved towards the center of the recorded track. As long as this result is obtained, the apparatus continues to move the head 42 step by step in the same direction.

When the reproduced RF signal level after the movement of the head by one step is less than the reproduced RF signal level before the movement of the head, this means that the head has moved away from the center of the recorded track. In this case, the head 42 is then moved step by step in the opposite direction.

By performing the foregoing control, the apparatus ensures that the head 42 traces the center of a desired track. After the tracking has been correctly established, reproduction is executed.

As described above, in the conventional electronic still video reproducing apparatus, when a track is selected or designated, tracking control is performed so that the head traces the center of a desired track, and thereafter reproduction is started. A time of, e.g., about 130 msec is needed for establishing proper tracking. A still image cannot be reproduced during this time. Therefore, in the conventional electronic still video reproducing apparatus, there is the problem that a substantial time elapses from the time when a desired track is selected or designated until the time when reproduction begins.

OBJECTS AND SUMMARY OF THE INVENTION

An object of the invention is to remedy the problems of conventional apparatus noted above. In particular, an object of the invention is to provide a head moving apparatus that can promptly start the reproduction after a track is designated.

The foregoing and other objects are attained in accordance with one aspect of the invention by the provision of tracking control apparatus for reproducing signals on a rotary disk having a plurality of concentric recording tracks, the apparatus comprising: transducer means for obtaining reproduced signals from each of the tracks; slide means for sliding the transducer means in a direction that is radial with respect to the disk; motor means for rotating the disk; detector means for detecting the signals reproduced from each of the tracks; and memory means for storing, as to each of the tracks, a tracking position at which the detector means detects signals of maximum strength, wherein the slide means is responsive to the memory means for sliding the transducer means in accordance with the tracking position stored in the memory means with respect to a selected track when the transducer means again reproduces the signals recorded on the selected track.

In accordance with an independent aspect of the invention, there is provided tracking control apparatus for reproducing signals on a rotary disk having a plurality of concentric recording tracks, each of the tracks have a mechanical center and the apparatus comprising: motor means for rotating the disk; transducer means for obtaining reproduced signals from a selected one of the tracks as the disk rotates; slide means for sliding the transducer means in a direction that is radial with respect to the disk so that the transducer means obtains reproduced signals from the mechanical center of the selected track and from positions slightly offset with respect thereto; detector means for detecting the signals reproduced from the mechanical center of the selected track and from the positions slightly offset with respect thereto and for determining a correct tracking position required to obtain a maximum level of the reproduced signals; and memory means for storing the correct tracking positions; wherein the slide means is responsive to the memory means for sliding the transducer means directly to the correct tracking position when the transducer means again reproduces the signals recorded on the selected track.

The preceding and other objects, features and advantages of the present invention will become apparent from the following detailed description and the appended claims with reference to the accompanying drawings.

BRIEF DESCRIPTION OF THE DRAWINGS

FIG. 1 is a diagrammatic view of a tracking circuit in a conventional electronic still video reproducing apparatus;

FIG. 2 is a circuit diagram showing a recording system suitable for use with an electronic still video reproducing apparatus according to the present invention;

FIG. 4 shows a magnetic disk which is used in the electronic still video reproducing apparatus;

DESCRIPTION OF THE PREFERRED EMBODIMENT

Figure 3:
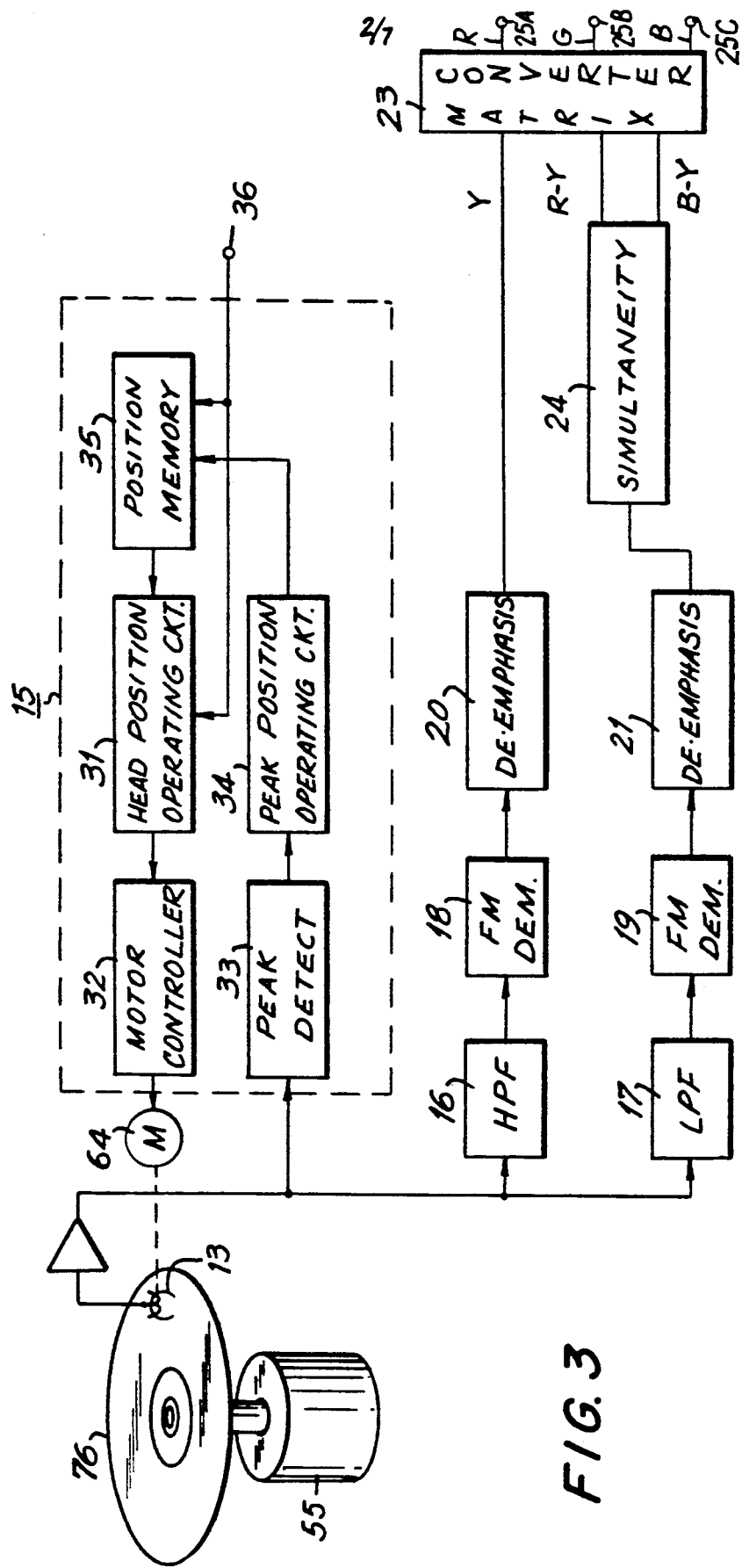
FIG. 3 is a circuit diagram showing a reproducing system constructed in accordance with the invention.

According to the invention, in a head moving apparatus which is suitable for use in an electronic still video reproducing apparatus, tracking information for each track is previously stored in a memory; in the reproducing mode, the head is moved on the basis of the stored tracking information, thereby enabling the head to be instantaneously moved to the position required to obtain the best signal from the selected or designated track.

After the disk with the image signals recorded thereon is loaded into the reproducing apparatus but before the reproduction is started, tracking control is performed with respect to each track, and the distance from the position of the mechanical center of each track to the correct tracking position is calculated. The calculated distance data is stored into a position memory device 35.

When reproducing the video images from a selected or designated recording track, the distance data from the mechanical center on the track to the correct tracking position is read out of the position memory 35. By use of this distance data, a head 13 can be immediately moved to the correct tracking position on a desired track so that reproduction can be started immediately.

A preferred embodiment of the present invention is described in detail hereinbelow with reference to the drawings.

The invention is used in an electronic still video reproducing apparatus for reproducing still image video signals recorded on a magnetic disk. The electronic still video recording apparatus is described first. FIG. 2 shows a recording system with which the electronic still video reproducing apparatus of the invention can be used. In FIG. 2, composite video signals are supplied from an input terminal 1 to a decoder 2. A luminance signal Y and line sequenced color difference signals (R-Y) and (B-Y) are formed from the composite video signals. The luminance signal Y is supplied to a frequency modulator 4 through a preemphasis circuit 3 having a nonlinear characteristic. The line sequenced color difference signals (R-Y) and (B-Y) are supplied to a frequency modulator 6 through a preemphasis circuit 5 having a nonlinear characteristic. Outputs of the frequency modulators 4 and 6 are supplied to an adder 7, so that the frequency modulated luminance signal Y and the frequency modulated line sequenced color difference signals (R-Y) and (B-Y) are multiplexed. An output of the adder 7 is supplied to a head 9 through a recording amplifier 8.

The center frequency of the frequency modulated luminance signal Y is set to a predetermined frequency within a range, e.g., from 6 to 7.5 MHz. The center frequency of the red color difference signal (R-Y) is set to, e.g., 1.2 MHz. The center frequency of the blue color difference signal (B-Y) is set to, e.g., 1.3 MHz. The video signals of one field which are composed of the frequency modulated luminance signal Y and the frequency modulated line sequenced color difference signals (R-Y) and (B-Y) are recorded on a single track of the magnetic disk. In the case of the frame recording mode, the video signals of one frame are recorded on two tracks.

As FIG. 4 shows, the outer diameter 1 of the magnetic disk which is used in this embodiment is equal to, e.g., 57 mm; fifty circular main tracks T and one cue track can be formed on the magnetic disk. The track pitch is set to, e.g., 100 μm and the track width is set to, e.g., 60 μm. The radius of the first track is set to 25 mm. Therefore, the center radius of the nth track is obtained as follows:

$$25-(n-1)\times 3.1 \text{ mm}$$

Not only the still image video signals but also the signals which are obtained by time base compressing audio signals can be recorded on the tracks. On the other hand, various kinds of information can be also recorded in the deep layer of the disk.

A mechanism for moving a head relative to the magnetic disk is described below.

Figure 5:
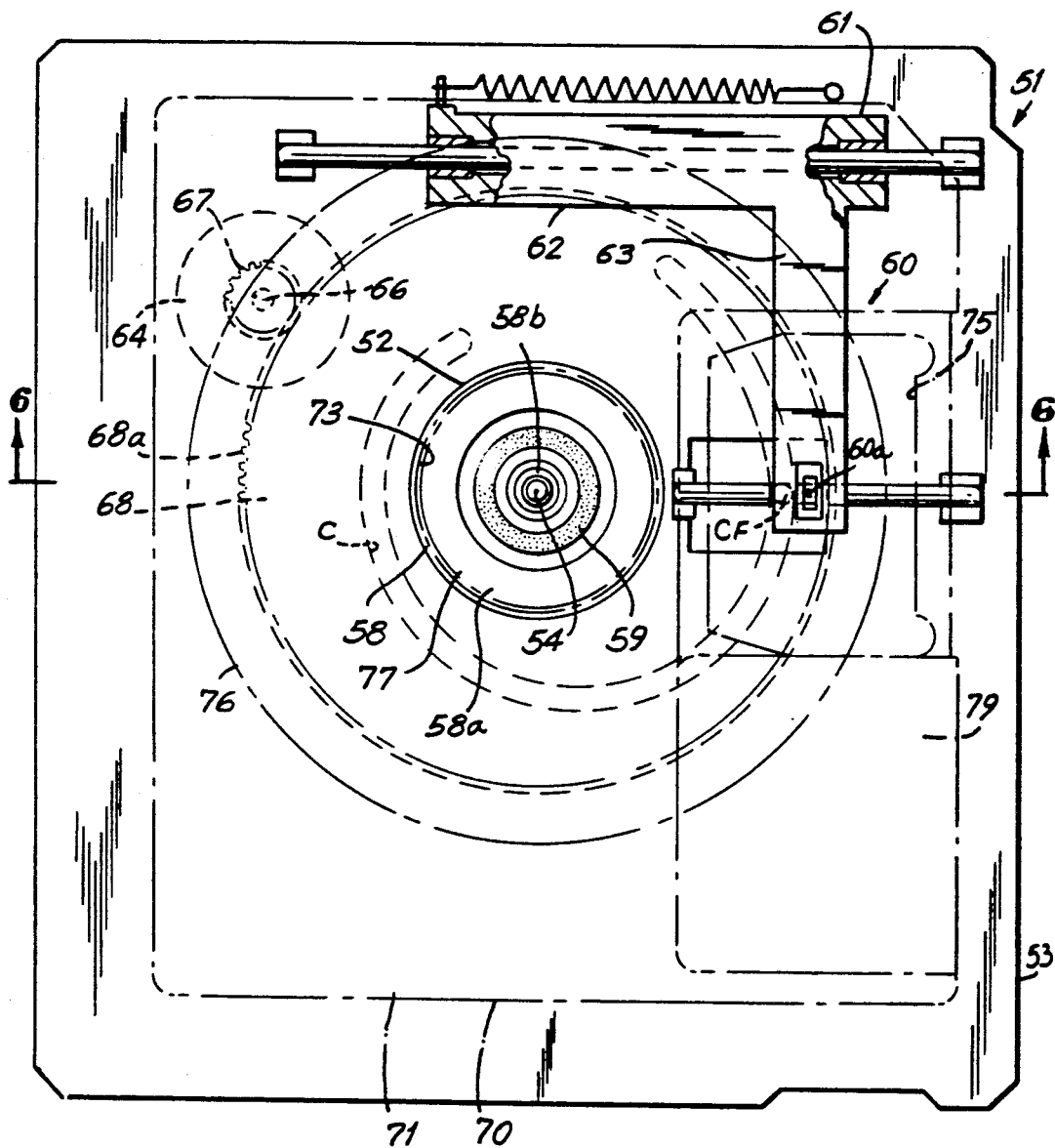
FIG. 5 is a plan view showing a head moving mechanism in the electronic still video reproducing apparatus.
Figure 6:
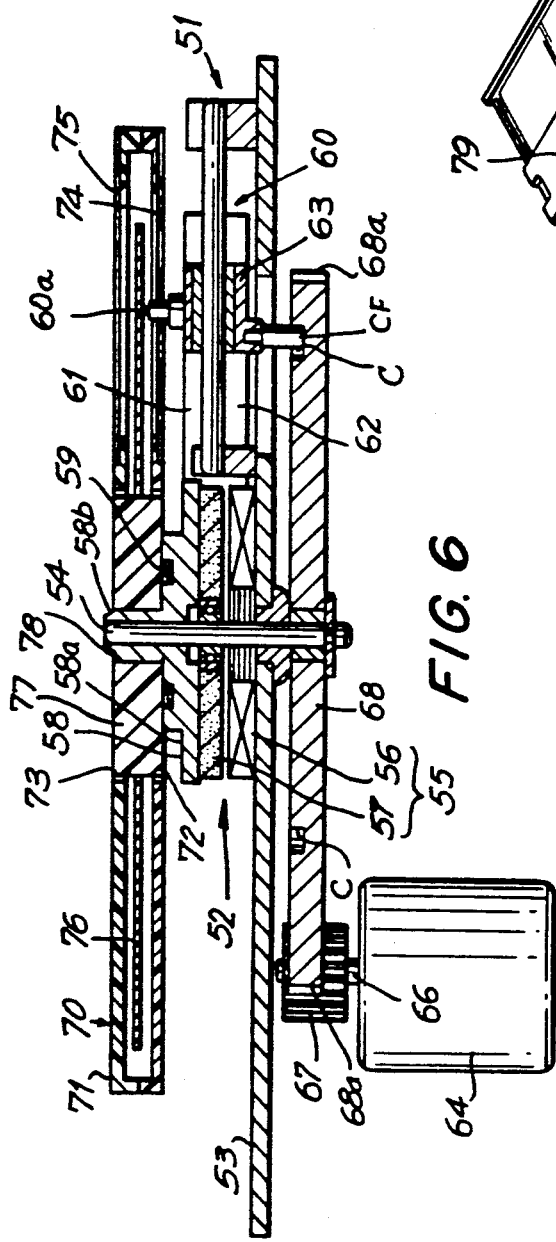
FIG. 6 is a cross sectional view taken substantially along the line 6—6 in FIG. 5 and looking in the direction of the arrows.

The embodiment shown in the drawing relates to a head moving mechanism in a magnetic disk drive apparatus 51 to which the invention is applied. FIGS. 5 and 6 show the head moving mechanism.

A spindle mechanism 52 is mounted approximately in the center of the upper surface of a chassis 53. The spindle mechanism 52 comprises a supporting axle 54 fixed to the chassis 53, a spindle 58 which is rotatably supported by the supporting axle 54, and a spindle motor 55 to rotate the spindle 58.

The supporting axle 54 is fixed to the chassis 53 at a position which is slightly higher than the lower end of the supporting axle 54 so as to penetrate the chassis 53 in the direction of its thickness.

The spindle motor 55 comprises a stator 56 fixed to the chassis 53 and a rotor 57 which is arranged so as to face the stator 56 and is rotatably supported by the supporting axle 54.

The spindle 58 is fixed to the upper surface of the rotor 57 of the spindle motor 55. The spindle 58 comprises a disk portion 58a whose diameter is substantially the same as that of the rotor 57 and a substantially cylindrical engaging sleeve 58b that projects upwardly from the central portion of the disk portion 58a. The upper end of the supporting axle 54 penetrates the engaging sleeve 58b. A substantially ring-shaped chuck magnet 59 is attached to the upper surface of the disk portion 58a.

When the spindle motor 55 rotates, the spindle 58 is also rotated.

A head moving mechanism 60 comprises a head supporting member 61 that supports a magnetic head 60a, a cam gear 68 for moving the head supporting member 61 via a cam C and cam follower CF, and a drive gear 67 and a motor 64 for rotating the cam gear 68.

The head supporting member 61 comprises an almost-square, pillar-shaped base portion 62 and an arm portion 63. The base portion 62 is elongated in a direction extending from left to right in FIG. 5. The arm portion 63 extends from near the right end of the base portion 62 towards the front of the apparatus. (The bottom of FIG. 5 is regarded so the front and the top as the rear of the apparatus. This convention is adopted also in the following description.)

The motor 64 is attached to the lower side of the chassis 53. The drive gear 67 is fixed to an output shaft 66 of the motor 64. The drive gear 67 engages gear teeth 68a formed on the outer peripheral surface of the cam gear 68.

When the motor 64 is rotated clockwise (FIG. 5), the drive gear 67 is also rotated clockwise, so that the cam gear 68 is rotated counterclockwise. The spiral cam C then moves the cam follower CF and magnetic head 60a radially inward with respect to the disk 76. On the other hand, when the motor 64 is rotated counterclockwise, the cam gear 68 is rotated clockwise. The spiral cam C then moves the cam follower CF and magnetic head 60a radially outward with respect to the disk 76.

Figure 7:
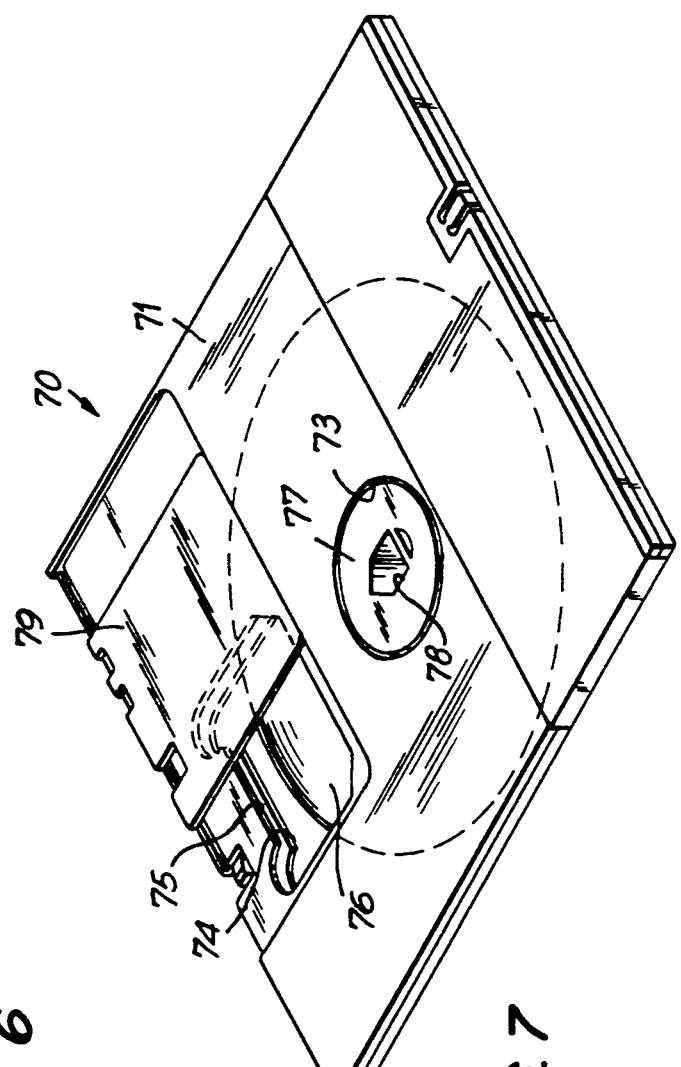
FIG. 7 is a perspective view of a magnetic disk cassette for the magnetic disk of FIG. 4.

FIG. 7 shows a magnetic disk cassette which is used in the foregoing mechanism.

Reference numeral 70 denotes a magnetic disk cassette and 71 indicates a cassette casing thereof. The cassette casing 71 is an almost-square, very thin box. A center hole 73 and a similar hole (not visible) on the opposite side of the casing 71 are formed substantially in the central portion of the casing 71. In addition, head windows 74 and 75 are formed near one side edge of the casing 71.

The magnetic disk 76 is rotatably enclosed in the cassette casing 71. A recording surface made of a magnetic layer is formed on one side of the magnetic disk 76. A center core 77 is attached to the central portion of the magnetic disk. An engaging hole 78 into which the engaging axle 58b of the spindle 58 is fitted is formed in the center core 77. The upper and lower surfaces of the center core 77 are located so as to be exposed by the center hole 73 and the similar hole formed in the opposite side of the cassette casing 71.

Numeral 79 denotes a shutter for opening and closing the head windows 74 and 75 (in FIG. 7, the head windows 74 and 75 are shown partly open). The shutter 79 closes the head windows 74 and 75 when the magnetic disk cassette 70 is not in use. When the cassette 70 is inserted in the magnetic disk drive apparatus 51, the shutter 79 is automatically moved so as to open the head windows 74 and 75.

When the head windows 74 and 75 are open, the portions of the magnetic disk 76 aligned with the head windows 74 and 75 are exposed to the outside.

FIG. 3 shows the reproducing system. In FIG. 3, reference numeral 76 denotes the magnetic disk on which video signals of one field are recorded in each of the circular tracks. The magnetic disk 76 is rotated by a spindle motor 55. The video signals recorded on the magnetic disk 76 are reproduced by a head 13. The head 13 is driven by the drive motor 64. A stepping motor is used as the drive motor 64. The drive motor 64 is controlled by a head moving circuit 15 to which the invention is applied. When a desired track is designated, the head 13 can instantaneously correctly track and reproduce the video signals recorded on the designated track on the magnetic disk 76. This tracking control is described in detail hereinbelow.

The reproduction signals from the head 13 are supplied to a high pass filter 16 and a low pass filter 17. The frequency modulated luminance signal Y is supplied as an output by the high pass filter 16. The frequency modulated line sequenced color difference signals (R-Y) and (B-Y) are supplied as an output from the low pass filter 17. The output of the high pass filter 16 is supplied to a frequency demodulator 18. The output of the low pass filter 17 is supplied to a frequency demodulator 19.

The demodulated output of the frequency demodulator 18 is supplied to a matrix converter 23 through a deemphasis circuit 20. The demodulated output of the frequency demodulator 19 is supplied to a simultaneity circuit 24 through a deemphasis circuit 21. The line sequenced color difference signals (R-Y) and (B-Y) are made simultaneous by the simultaneity circuit 24. The resultant simultaneous color difference signals (R-Y) and (B-Y) are supplied to the matrix converter 23. Three primary color signals R, G, and B are formed by the matrix converter 23 and are taken out from output terminals 25A, 25B, and 25C, respectively.

The head moving circuit 15 will now be described in detail. As mentioned before, the central position of the nth track is obtained as follows.

$$[25-(n-1)\times 0.1]mm$$

The central position on each track which is obtained in this manner is referred to as a mechanical center as mentioned before.

After the magnetic disk 76 is inserted in the reproducing apparatus but before the reproduction is started, the head 13 is moved to the mechanical center of each track, and tracking control is performed for each track.

More particularly, when the magnetic disk 76 is inserted, the distance $[25-(1-1)\times 0.1=25]mm$ to the mechanical center of, e.g., the first track is calculated by a head position operating circuit 31. This distance data is given to a motor controller 32. Pulses of a number corresponding to the distance data are supplied as an output by the motor controller 32. These pulses are supplied to the drive motor 64. The head 13 is moved to the mechanical center of the first track by the drive motor 64. The head 13 is moved radially inwardly or outwardly with respect to the disk one step at a time. One step corresponds to, e.g., 10 μm. The reproduction RF signal level before the head 13 is moved by one step is stored in a peak level detector 33. The reproduction RF signal level before the head is moved by one step and the reproduction RF signal level after the head is moved by one step are compared in the peak level detector 33. By comparing the reproduction RF signal levels before and after the movement of the head 13 by one step in this manner, the position corresponding to the maximum reproduction RF signal level (the correct tracking position) is detected. An output of the peak level detector 33 is supplied to a peak position operating circuit 34. Any deviation between the maximum level position and the mechanical center is calculated. This deviation from the mechanical center is stored in a position memory 35.

Operations similar to that described above are executed with respect to each of, e.g., fifty main tracks and a cue track. Thus, the correct tracking position with respect to the mechanical center of each track is stored in the position memory 35.

After the correct tracking position with respect to the mechanical center of each track is stored in the position memory 35, the reproduction is started. A track designation signal from a terminal 36 is supplied to the head position operating circuit 31 and to the position memory 35. When the track on which a desired still image is recorded is designated, the position data (with respect to the mechanical center of the designated track) which is required for correct tracking of the designated track is supplied as an output from the position memory 35. The required movement of the head 13 is corrected on the basis of this correct tracking position data. The distance through which the head 13 moves to the correct tracking position for the designated track is obtained by the head position operating circuit 31. A signal corresponding to this movement distance is supplied by the circuit 31 to the motor controller 32. Pulses of a number corresponding to this movement distance are supplied as an output by the motor controller 32. These pulses are supplied to the drive motor 64.

Figure 8:
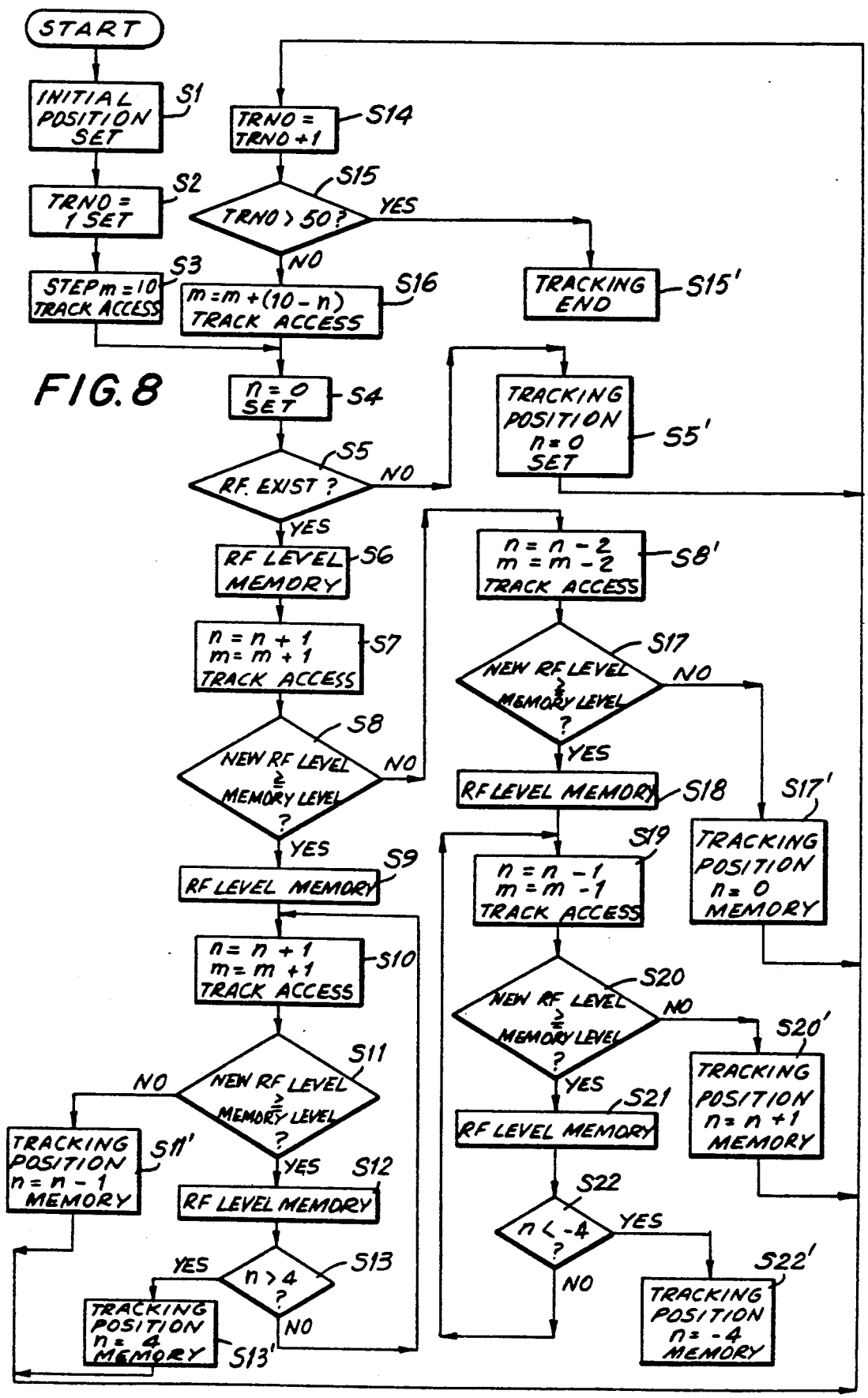
FIG. 8 is a flowchart showing how head tracking is effected in accordance with the invention.

The foregoing tracking control is described in greater detail hereinbelow with the reference to the flowchart of FIG. 8. When the disk is inserted in the reproducing apparatus, the recording state of the video signals or audio signals on each track is examined and the auto tracking operation is also simultaneously performed.

STEP S1: The intial position is set ("INITIAL POSITION SET").

The head is moved to the position of the origin which is mechanically determined. This position is used as a reference position for the absolute position on the track and is located to the outside of the mechanical center of the first track by ten steps (one step is equal to 10 μm): i.e., at the 0 (zero) position shown on the right side in FIG. 9A. The relative step counter n is set to 0.

STEP S2: Track No. 1 is set ("TRNO=1 SET").

The TRNO (the count value of the track number) is set to 1.

STEP S3: The head is moved to the inside of the origin position by ten steps ("STEP m=10 TRACK ACCESS").

The head is moved to the mechanical center on the first track, which is to the inside of the origin by ten steps. The value m denotes a count of the absolute value of the step movement amount of the head.

STEP S4: The relative step counter n is reset ("n=0 SET").

The count n in the relative step counter is set to 0. The number of steps corresponding to the difference between the mechanical center of the track and the head position is counted.

STEP S5: The recording signal is checked for its presence or absence ("RF EXIST?").

The presence or absence of the recording signal is checked. If the signal exists, step S6 follows. If no signal exists, step S5' follows.

STEP S5': The value 0 is stored in the relative step counter n ("TRACKING POSITION n=0 SET").

If the recording signal does not exist, the relative number n=0 is stored in the relative step counter n and step S14 follows.

STEP S6: The recording signal level is stored ("RF LEVEL MEMORY").

The level of the recorded signal is stored in memory.

STEP S7: The head is moved to the inside by one step ("n=n+1, m=m+1, TRACK ACCESS").

The count values of the absolute step counter m and of the relative step counter n are respectively increased by +1. After the increase of each count value, the head is moved to the next track. The reason for this augmenting process is that the absolute step counter is used to manage the track movement of the head from the origin and the relative step counter is used to keep track of deviations from the mechanical centers of the several tracks.

STEP S8: A comparison is made of the preceding head position signal level (before the movement) and the new head position signal level (after the movement) ("NEW RF LEVEL≧MEMORY LEVEL?").

The signal level after the head is moved is compared with the stored signal level before the movement. If the new level (after the movement)≧the preceding level (before the movement), step S9 follows. Otherwise, step S8' follows. Thus a check is made to see whether or not the correct tracking position is located inwardly of the preceding position.

STEP S8': The head is moved to the outside of its present position by two steps (i.e., to the outside of the mechanical center by one step) ("n=n−2, m=m−2, TRACK ACCESS")

Since the signal level at the preceding head position is larger than the signal level at the new head position, the correct tracking position is known to be located to the outside of the mechanical center. Therefore, the head is moved towards the outside of the mechanical center by one step. The correspondence between values of n and positions on the disk at steps S4, S7 and S8' is as follows:

STEP S4: n=0 mechanical center

STEP S7: n=n+1 position which is to the inside of the mechanical center by one step STEP S8': n=n−2 position which is to the outside of the mechanical center by one step STEP S9: The signal level is stored ("RF LEVEL MEMORY").

The signal level after the head is moved is stored in memory.

STEP S10: The head is moved to the inside by one step ("n=n+1, m=m+1, TRACK ACCESS").

The head is moved to the inside by one step in a manner similar to step S7.

STEP S11: A level comparison is made ("NEW RF LEVEL>MEMORY LEVEL ?").

The new and preceding signal levels are compared in a manner similar to step S8. If the new level is equal to or greater than the preceding level, step S11' follows. If the new level is less than the preceding level, step S12 follows.

STEP S11': The tracking position is determined ("TRACKING POSITION n=n −1 MEMORY").

If, as a result of the level comparison in step S11, the preceding level stored was found to be greater than the signal level at the step where the head is located, the correct tracking position is at the preceding position instead of the present position. Therefore, the number of relative steps at the correct tracking position is equal to the value obtained by subtracting +1 from the present count value. The correct tracking position n on this track is stored as n−1. Then, step S14 follows to perform the tracking of the next track.

STEP S12: The level is stored ("RF LEVEL MEMORY").

The signal level after the head is moved is stored.

STEP S13: The number of relative steps is checked ("n>4?").

If the number of relative steps is greater than 4, represents the maximum permissible deviation, step S13' follows If it is equal to or less than 4, the processing routine is returned to step S10.

STEP S13': The tracking position is determined ("TRACKING POSITION n=4 MEMORY").

Since the tracking position lies within a range from +4 to −4 with respect to the mechanical center, the limit value "4" in the + direction is stored as the correct tracking position for this track.

STEP S14: The value +1 is added to the track number ("TRNO =TRNO+1").

The track number is increased by +1 to perform the tracking of the next track.

STEP S15: The track number is checked ("TRNO >50 ?").

A check is made to determine whether or not the result of the addition in step S14 is greater than 50. If YES, this means that the tracking of fifty tracks has already been completed, so that step S15' follows. If it is equal to or less then 50, step S16 follows.

STEP S15': The tracking ends ("TRACKING END").

The auto-tracking operation is finished. The correct tracking positions of all tracks have been stored in memory, and signal reproduction can begin.

STEP S16: The head is moved to the next track ("m=m+(10−n) TRACK ACCESS").

The head is moved to the mechanical center of the next track. The number of steps required to reach the mechanical center of the next track is obtained by (10−n). Therefore, the absolute step amount m of the next track is calculated by m=m+(10−n).

STEP S17: A level comparison is made ("NEW RF LEVEL>MEMORY LEVEL?").

The new and preceding signal levels are compared in a manner similar to step S11. If the new signal level is equal to or greater than the preceding signal level, step S18 follows. If the new level is less than the preceding level, step S17' follows.

STEP S17': The tracking position is determined ("TRACKING POSITION n=0 MEMORY").

If, as a result of the level comparison in step S17, the preceding level stored was found to be greater than the signal level at the present position of the head, the correct tracking position is set to the preceding head position instead of the present head position. Therefore, the number of relative steps at the correct tracking position is set to a value which is derived by adding +1 to the present count value. The correct tracking position n on this track is stored as (n+1) (namely, at the mechanical center). Then, step S14 follows to perform the tracking of the next track.

STEP S18: The level is stored ("RF LEVEL MEMORY").

The signal level after the head is moved is stored.

STEP S19: The head is moved ("n=n−1, m=m−1, TRACK ACCESS").

The head is moved to the outside by one step.

STEP S20: A level comparison is made ("NEW RF LEVEL>MEMORY LEVEL?").

The new and preceding signal levels are compared in a manner similar to step S17. If the new signal level is equal to or greater than the preceding signal level, step S21 follows. If the new level is less than the preceding level, step S20' follows.

STEP S20': The tracking position is determined ("TRACKING POSITION n=n+1 MEMORY").

If, as a result of the level comparison in step S20 in a manner similar to step S17, the preceding signal level stored was found to be greater than the signal level at the step of the present head position, the correct tracking position is set to the preceding head position instead of the present head position. Therefore, the number of relative steps at the correct tracking position is set to a value which is derived by adding +1 to the present count value. The correct tracking position n on this track is stored as (n+1). Then, step S14 follows to perform the tracking of the next track.

STEP S21: The level is stored ("RF LEVEL MEMORY").

The signal level after the head is moved is stored in memory.

STEP S22: The number of relative steps is confirmed ("n< −4").

The number of relative steps is checked. If it is less than −4, step S22' follows. If it is equal to or greater than −4, the processing routine is returned to step S19.

STEP S22': The tracking position is determined ("TRACKING POSITION N= −4 MEMORY").

Since the tracking position falls within a range from +4 to −4 from the mechanical center, the maximum deviation value of −4 in the direction of the outer periphery is stored as the correct tracking position.

The locus of the head when the tracking position is located at each step (+4 to 0 to −4) will now be further described in detail with reference to FIGS. 9A to 9K.

Figure 9A:
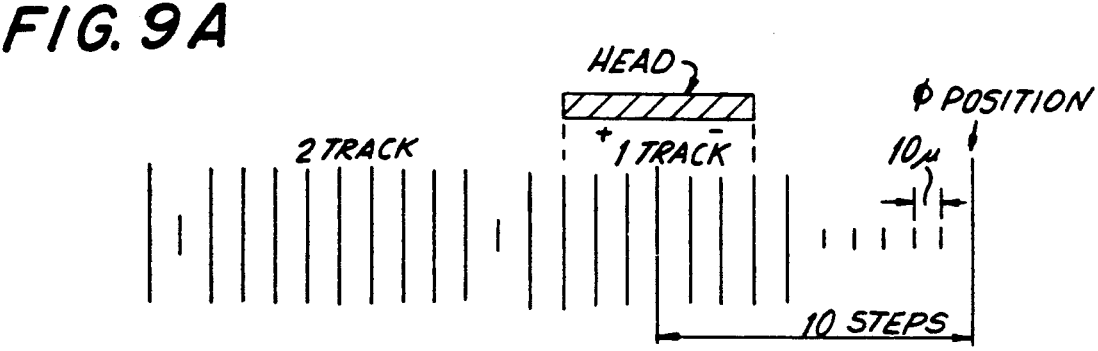
FIGS. 9A to 9K are detailed diagrams showing loci of the head tracking according to the invention.

The 0 position in FIG. 9A is the origin position, which is mechanically determined. The center of the No. 1 track is at a position which is removed from the origin in the direction of the center of the disk by ten steps (one step is equal to 10 μm). The width of an ordinary head is 60 μm and corresponds to six steps. The distance between tracks is set to 100 μm (ten steps) and a guard band of 40 μm is provided.

FIGS. 9B to 9F show the cases where the correct tracking position is towards the inside in the radial direction of the disk from the mechanical center (n=0) of the track.

Figure 9B:
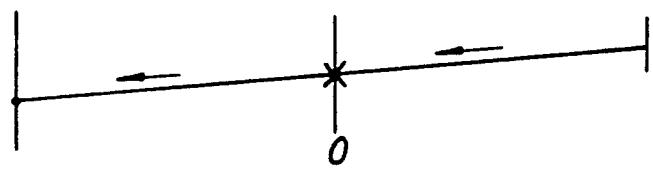

FIG. 9B shows the case where no signal is recorded on the track. If no signal is derived when attempting to reproduce at the mechanical center (n=0) of this track, the head is not moved to another step on this track.

Figure 9C:
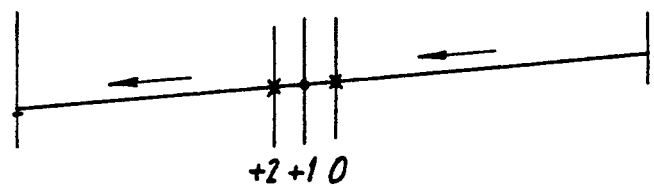

FIG. 9C shows the case where the tracking position is inside the center (n=0) of the track by +1 step. The levels at the steps n=0 and n=+1 are compared. Since the level at the step (n=1)≧the level at the step (n=0), the levels at the steps n=+1 and n=+2 are further compared. Since the level at the step (n=1)≧the level at the step (n=2), the position at the step (n=1) is determined to be the correct tracking position and at the same time, the step (n=1) is stored. The tracking of the next track is then performed.

Figure 9D:
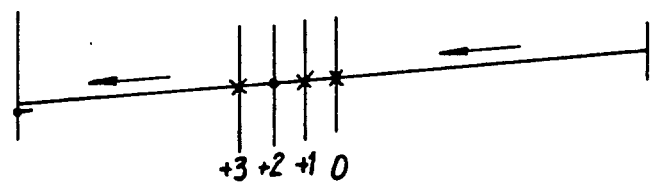
Figure 9E:
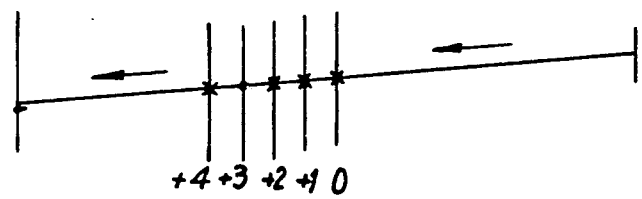
Figure 9F:
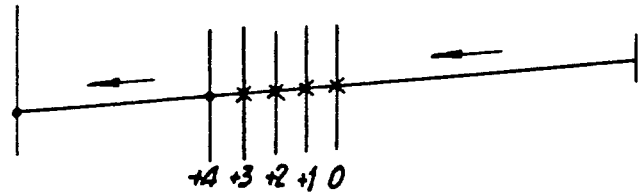

In FIGS. 9D to 9F, in a manner similar to FIG. 9C, the levels at the respective steps are sequentially compared and, at the same time, the correct tracking position is determined and stored. Then, the tracking of the next track is performed.

Figure 9G:
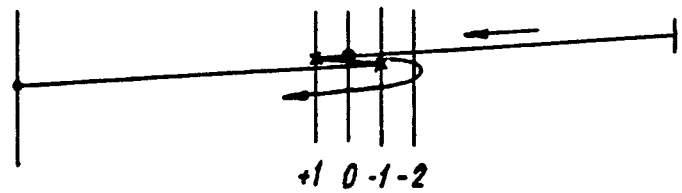
Figure 9H:
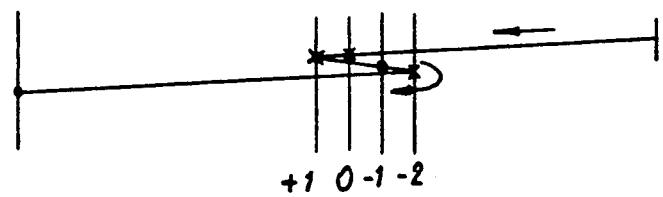
Figure 9I:
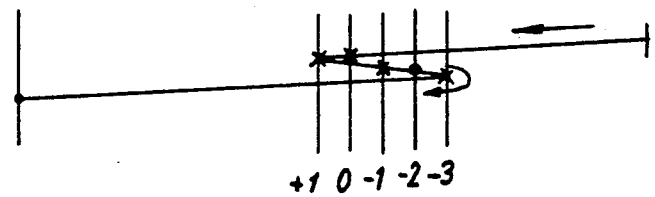
Figure 9J:
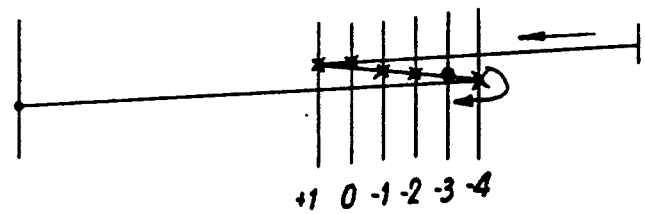
Figure 9K:
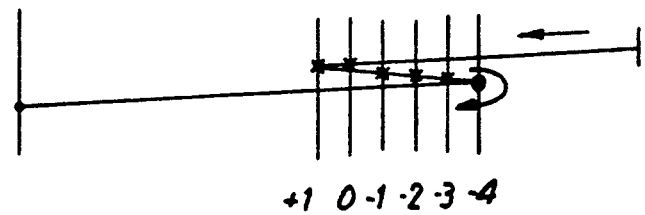

FIGS. 9H and 9K show the cases where the correct tracking position is outside the mechanical center (n=0) of the track in the radial direction of the disk.

FIGS. 9G shows the case where the correct tracking position is located at the mechanical center of the track. First, the levels at the steps (n=0) and (n=+1) are compared. Since the level at the step (n=0) the level at the step (n=+1), the levels at the steps (n=0) and (n=−1) are further compared. Since the level at the step (n =0) the level at the step (n=−1), the position at the step (n=0) is determined to be the correct tracking position and at the same time, the level corresponding to the step (n=0) is stored. Then, the tracking of the next track is performed.

In FIGS. 9H to 9K, in a manner similar to FIG. 9G, the levels at the respective steps are sequentially compared and the correct tracking position is determined and stored. Then, the tracking of the next track is performed.

In this embodiment, as a method of storing the tracking information, the number of relative steps from the mechanical center of each track is stored because, when the absolute value is stored, the maximum number of steps becomes 514, so that the number of digits increases and additional memory capacity is needed. Examples of the relative step number are given below:

| (MSB) (LSB) | Number of relative steps |
| --- | --- |
| 0001 | −4 |
| 0010 | −3 |
| 0011 | −2 |
| 0100 | −1 |
| 0101 | 0 |
| 0110 | +1 |
| 0111 | +2 |
| 1000 | +3 |
| 1001 | +4 |

As a method of caluclating the tracking position of each track, the following equation is used:

$$m = 10 + 10 \times (TRNO - 1) + n$$

where m is the absolute step amount from the origin (zero position) of the track; 10 is the offset from the origin to the first track;

10 is the interval between tracks and equals ten steps;

TRNO is the track number of the track; and n is the number of relative steps from the correct tracking position stored to the mechanical center of the track.

As described above, the correct tracking position data relative to the mechanical center of the designated track is preliminarily stored in the position memory 35. Therefore, upon reproduction, there is no need to perform the tracking after the head 13 is moved. After the head 13 is moved to a desired track, the reproduction can be immediately started.

In the foregoing embodiment, the distance from the mechanical center is used as the tracking position information to be obtained before the reproduction is started. However, another position may alternatively be used as a reference position. Also, while in this embodiment the tracking position information is stored in the position memory 35, this data can alternatively be recorded in a deep layer in each track on the magnetic disk 11 immediately before the magnetic disk 11 is removed from the recording apparatus. This data can be also recorded on the cue track. Then, in the case of reproducing by the same apparatus, the head 13 can be moved to the correct tracking position by use of the tracking position information recorded on the magnetic disk 11.

The present invention can of course be similarly applied to apparatus for reproducing signals from a disk on which data has been recorded digitally.

According to the invention, the distance from the position of the mechanical center to the position for correct tracking of each track is calculated before the reproduction is started. This distance data is stored in a memory. When reproducing video signals on a desired recording track, the distance data from the mechanical center to the correct tracking position which has previously been stored is used. Thus, when the reproduction is started, the head can be immediately moved to the correct tracking position on a desired track.

Although the present invention has been shown and described with respect to a preferred embodiment, various changes and modifications which are obvious to a person skilled in the art to which the invention pertains are within the spirit and scope of the invention. Accordingly, the invention is limited only by the appended claims.

We claim:

1. Tracking control apparatus for a device for reproducing signals recorded on a rotating disk having a plurality of concentric tracks with a known mechanical center recorded thereon, said tracking control apparatus comprising:

transducer means for reproducing signals from each of said tracks;

transducer positioning means for radially positioning said transducer means to a respective mechanical center of each successive one of said plurality of tracks on said disk and positioning said transducer radially from the mechanical center of each track by an incremental step substantially less than a track width, whereby said transducer means sequentially reproduces signals from at least two locations in each of said plurality of tracks;

detector means for detecting levels of the signals sequentially reproduced by said transducer means from at least two locations in each of said tracks;

means for comparing a detected signal level at said mechanical center position with a signal level at an incremental step position and sequentially determining a deviation from said mechanical center position for each successive track based on a highest detected signal level;

memory means for storing said deviation for each successive track from said means for comparing as said detector means sequentially detects signals of maximum level for each successive one of said plurality of tracks; and means for receiving a track designation signal designating a selected track for reproduction and for connecting said track designation signal to said transducer positioning means and to said memory means, wherein following said determining said deviation for each successive one of said plurality of tracks and storing each said deviation in said memory means and upon receiving said track designation signal said transducer positioning means is responsive to said known mechanical center and said deviation from said known mechanical center from said memory means and said track designation signal for sliding the transducer means to said selected track.

2. Tracking control apparatus according to claim 1, further comprising means for recording the contents of said memory means onto a cue track of the rotating disc, so that when a disk is newly inserted into the apparatus said transducer means is positioned with respect to said selected track on the basis of said cue track.

3. Tracking control apparatus for a device for reproducing signals recorded on a rotating disk having a plurality of concentric recording tracks, each of said tracks having a predetermined width with a known mechanical center, said tracking control apparatus comprising:

transducer means for obtaining reproduced signals from a selected one of said tracks as said disk rotates;

slide means for sliding said transducer means radially relative to said disk so that said transducer means obtains reproduced signals from said mechanical center of said selected track and from positions offset radially with respect thereto by an incremental step that is small compared to said predetermined track width;

means for comparing a signal level at said mechanical center position with a signal level at a preceding tracking position separated by said incremental step and determining on the basis of the comparison whether the movement to said given tracking position was toward or away from a correct tracking position of the recorded track, whereby the transducer means is moved radially in said incremental steps until a maximum level of the reproduced signal is found corresponding to a deviation from said mechanical center;

memory means for storing said determined deviation from said mechanical center for each successive track on the disc; and means for receiving a track designation signal designating a selected track for reproducing and for connecting said track designation signal to said memory means and to said slide means, wherein following said determining of said deviation for each successive one of said plurality of tracks and upon receiving said track designation signal said slide means is responsive to said correct tracking position from said memory means for sliding said transducer means directly to said correct tracking position on said selected track.

* * * * *

UNITED STATES PATENT AND TRADEMARK OFFICE
CERTIFICATE OF CORRECTION

PATENT NO. : 5,073,835
DATED : December 17, 1991
INVENTOR(S) : Kohichi Sano; Toshitada Hayashi It is certified that error appears in the above-identified patent and that said Letters Patent is hereby corrected as shown below:

Col. 5, line 16, change "3.1" to --0.1--

Col. 9, line 57, after "4," insert --which--
   line 59, after "follows" insert --.--

Col. 11, line 40, after "compared" insert --.--
   line 56, after "(n=0)" insert -- $\geq$ --
   line 59, after "(n=0)" insert -- $\geq$ --

Col. 14, line 21, after "off" insert -- — --

Signed and Sealed this

Twentieth Day of April, 1993

*Attest:*

MICHAEL K. KIRK

*Attesting Officer*     *Acting Commissioner of Patents and Trademarks*